United States Patent [19]

Fujita et al.

[11] 4,167,623

[45] Sep. 11, 1979

[54] PULLULAN AMINOALKYL ETHER

[75] Inventors: Fumio Fujita, Osaka; Kosuke Fukami, Settsu; Masanori Fujimoto, Ibaragi, all of Japan

[73] Assignees: Sumitomo Chemical Company, Limited, Osaka; Hayashibara Biochemical Laboratories, Inc., Okayama, both of Japan

[21] Appl. No.: 848,033

[22] Filed: Nov. 3, 1977

[30] Foreign Application Priority Data

Nov. 8, 1976 [JP] Japan .................................. 51-134401

[51] Int. Cl.$^2$ ............................................. C07H 15/04
[52] U.S. Cl. ...................................... 536/120; 536/18; 536/1
[58] Field of Search ....................................... 536/120, 1

[56] References Cited

U.S. PATENT DOCUMENTS

| 2,813,093 | 11/1957 | Caldwell et al. | 260/233.3 |
|---|---|---|---|
| 3,598,730 | 8/1971 | Nordgren et al. | 210/54 |
| 3,870,537 | 3/1975 | Hijiya et al. | 106/162 |
| 4,031,307 | 6/1977 | De Martino | 536/114 |

FOREIGN PATENT DOCUMENTS 2178878 11/1973 France .

*Primary Examiner*—Johnnie R. Brown
*Assistant Examiner*—Blondel Hazel
*Attorney, Agent, or Firm*—Stevens, Davis, Miller & Mosher

[57] ABSTRACT

Pullulan aminoalkyl ether is obtained by reacting pullulan with an aminoalkylating agent in a solvent in the presence of an alkali. This ether may be used as a cationic polymer of considerable utility in industries. For instance, when used in a paper coating material, it gives desirable effects on gloss, RI dry pick, and RI wet pick and, furthermore, as compared with pullulan, markedly improves physical properties of the coated paper such as tearing strength, tensile strength and wrinkle recovery; it improves also retention of loading materials such as clay and calcium carbonate.

7 Claims, No Drawings

PULLULAN AMINOALKYL ETHER

This invention relates to novel aminoalkyl ethers and salts thereof, and to preparation thereof.

Pullulan is a high molecular weight linear polymer represented by the following general formula:

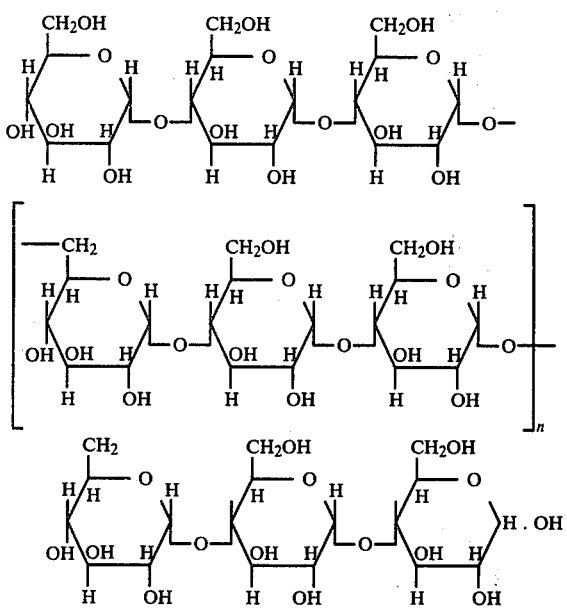

wherein n is an integer from 20 to 4,000.

Although containing glucose units in its molecule, pullulan is different in molecular structure and in properties from long known starch, cellulose, or their derivatives such as oxidized starch, hydroxyalkyl-celluloses and alkylcelluloses. For instance, starch is difficultly soluble in cold water, whereas pullulan is readily soluble in cold as well as hot water and its aqueous solution has a comparatively low viscosity compared with other water-soluble polymers.

Further, pullulan is excellent in film-forming property, transparency of its film, hygroscopicity and binding property and also exhibits excellent properties when used alone or in combination with other substances as a base material for paints, paper coating compositions, warp sizes, adhesives, resins, films, cosmetics and others.

Nevertheless, pullulan is a neutral substance, as is apparent from its chemical structure. Among water-soluble polymers, there are many, such as, for example, carboxymethylcellulose and polyethyleneimine, which have an electric charge in an aqueous solution and are industrially utilized to make the most of their anionic or cationic characteristics in aqueous solutions. Therefore, it was considered to be of considerable significance to render pullulan positively charged in an aqueous solution, its inherent characteristics being retained.

As a result of extensive studies, the present inventors found that a pullulan aminoalkyl ether is positively charged in an aqueous solution.

An object of this invention is to provide a cationic pullulan aminoalkyl ether and a method for the preparation thereof.

Other objects and advantages of this invention will become apparent from the following description.

According to this invention, there are provided a novel pullulan aminoalkyl ether, a salt thereof, and a method for the preparation thereof. Pullulan aminoalkyl ether provided by the present invention can be represented by the general formula

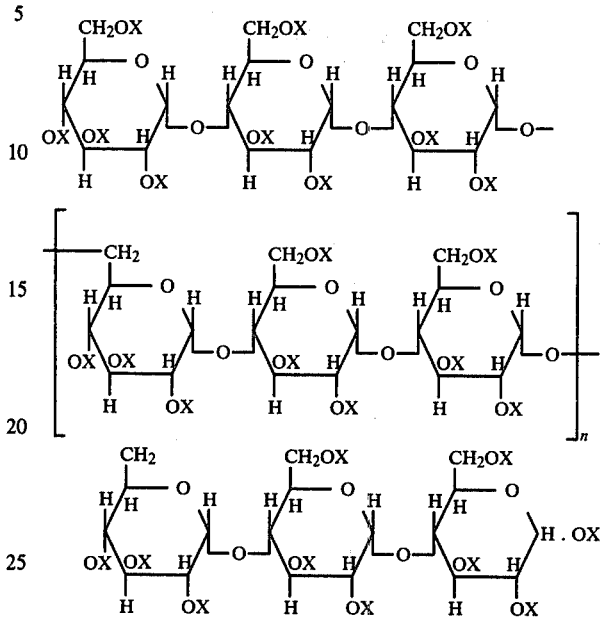

wherein n is an integer from 20 to 4,000 and X is H or a group represented by the general formula

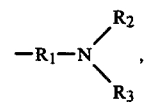

where $R_1$ is an alkylene group having 1 to 5 carbon atoms or a hydroxyalkylene group having 1 to 4 carbon atoms and $R_2$ and $R_3$ are each hydrogen or an alkyl group having 1 to 4 carbon atoms; the number ratio of hydrogen atom to the group

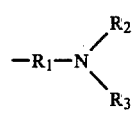

in X in one molecule being 0.001 to 2.0.

In the general formula

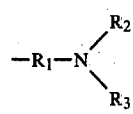

as mentioned above, $R_1$ is preferably

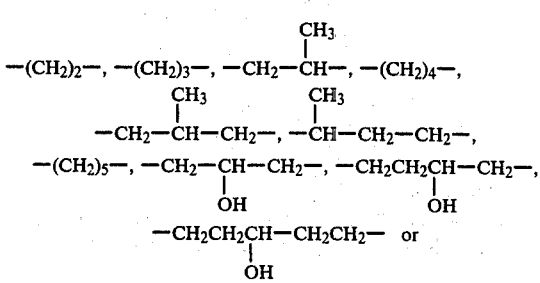

-continued $$-CH_2-CH-CH_2CH_2CH_2-,$$
$$\phantom{-CH_2-}OH$$

and a group represented by the general formula $$-R_1-N\begin{matrix}R_2\\R_3\end{matrix}$$

is preferably $-C_2H_4NH_2$, $-C_3H_6NH_2$, $-C_4H_8NH_2$, $C_5H_{10}NH_2$, $-CH_2\overset{OH}{\underset{|}{CH}}CH_2NH_2$, $-CH_2CH_2N\begin{matrix}H\\CH_3\end{matrix}$, $-CH_2CH_2N\begin{matrix}H\\C_2H_5\end{matrix}$, $-CH_2CH_2CH_2N\begin{matrix}H\\C_2H_5\end{matrix}$, $-CH_2CH_2CH_2CH_2N\begin{matrix}H\\C_3H_7\end{matrix}$, $-CH_2\overset{OH}{\underset{|}{CH}}CH_2N\begin{matrix}H\\C_2H_5\end{matrix}$, $-CH_2CH_2N\begin{matrix}CH_3\\CH_3\end{matrix}$, $-CH_2CH_2N\begin{matrix}C_2H_5\\C_2H_5\end{matrix}$, $-CH_2\overset{CH_3}{\underset{|}{CH}}N\begin{matrix}CH_3\\CH_3\end{matrix}$, $-CH_2\overset{OH}{\underset{|}{CH}}CH_2N\begin{matrix}CH_3\\CH_3\end{matrix}$ or $-CH_2\overset{OH}{\underset{|}{CH}}CH_2N\begin{matrix}C_2H_5\\C_2H_5\end{matrix}$.

The salts of pullulan aminoalkyl ether of the present invention include inorganic acid salts (e.g. hydrochloric acid salt, hydrobromic acid salt, sulfuric acid salt, nitric acid salt and the like), organic acid salts (e.g. acetic acid salt, oxalic acid salt and the like) and quaternary alkylamine salts thereof.

Pullulan aminoalkyl ether of the present invention can be prepared by reacting pullulan with an amine compound of the formula (I)

$$Y-R_1-N\begin{matrix}R_2\\R_3\end{matrix} \quad (I)$$

wherein Y is a halogen atom and $R_2$ and $R_3$ are each as defined above, in the presence of an alkali (e.g. sodium hydroxide, potassium hydroxide, etc.).

Suitable examples of the amine compound of the formula (I) as above are primary amines such as 2-aminoethyl chloride, 2-aminoethyl bromide, 2-aminoethyl iodide, 3-aminopropyl chloride, 3-aminopropyl bromide, 4-aminobutyl chloride, 4-aminobutyl bromide, 5-aminopentyl chloride, 3-amino-2-hydroxypropyl chloride and the like; secondary amines such as 2-methylaminoethyl chloride, 2-methylaminoethyl bromide, 2-methylaminoethyl iodide, 2-ethylaminoethyl chloride, 3-ethylaminopropyl chloride, 3-propylaminobutyl chloride, 3-ethylamino-2-hydroxypropyl chloride and the like and tertiary amine such as 2-dimethylaminoethyl chloride, 2-diethylaminoethyl chloride, 2-dimethylaminoisopropyl chloride, 3-dimethylamino-2-hydroxypropyl chloride, 3-diethylamino-2-hydroxypropyl chloride and the like.

Pullulan aminoalkyl ether of the present invention wherein $-R_1-$ is propylene can also be prepared by using a 3-amino-1,2-epoxypropane derivative of the formula (II)

$$H_2C-CH-CH_2-N\begin{matrix}R_2\\R_3\end{matrix} \quad (II)$$
$$\phantom{H_2C}\underset{O}{\diagdown\diagup}$$

wherein $R_2$ and $R_3$ are each as defined above, instead of said amine compound of the formula (I). Suitable examples of the amine compound of the formula (II) as above are primary amines such as 3-amino-1,2-epoxypropane, secondary amines such as 3-methylamino-1,2-epoxypropane, 3-ethylamino-1,2-epoxypropane, 3-propylamino-1,2-epoxypropane, 3-butylamino-1,2-epoxypropane and the like and tertiary amines such as 3-dimethylamino-1,2-epoxypropane, 3-diethylamino-1,2-epoxypropane, 3-dibutylamino-1,2-epoxypropane and the like. Moreover, pullulan aminoalkyl ether of the present invention wherein $R_2$ and $R_3$ are hydrogen atom can be prepared by using alkyleneimines such as ethyleneimine and propyleneimine.

The amount of the amines to be reacted with pullulan is 0.001 to 10, preferably 0.01 to 10 moles per glucose unit of pullulan, depending on the amine content of the intended pullulan aminoalkyl ether.

The reaction can be carried in a suitable solvent.

The solvent to be used in the reaction is not limited to any type, but a solvent which dissolves one or both of the pullulan and the aminoalkylating agent is preferred. For example, water, dimethyl sulfoxide, dimethylformaldehyde, and dimethylacetamide are used.

The reaction conditions are also not particularly limited, but the reaction temperature is preferably 0° C. to 200° C.

The organic or inorganic acid salts of pullulan aminoalkyl ether can be prepared by reacting pullulan aminoalkyl ether obtained as above with acids in a conventional manner.

The quaternary amine salts of pullulan aminoalkyl ether of the present invention can be prepared by reacting pullulan aminoalkyl ether obtained as above with an $C_1$–$C_4$ alkyl halide (e.g. iodide, chloride or bromide) in a conventional manner. For example, they can be prepared by reacting them in an alcohol (e.g. methanol) at a room temperature. Pullulan used in the present invention is known and can be prepared by the biosynthetic process as disclosed, for example, in U.S. Pat. No. 3,827,937. Physical properties of pullulan vary somewhat depending upon the strain used in the process. In the present invention, however, pullulan obtained from any strain can be used.

The pullulan aminoalkyl ether of this invention can be used in various fields as a cationic polymer of significant industrial utility. For instance, when used in a paper coating material, it gives desirable effects on gloss, RI dry pick and wet pick and, furthermore, as compared with pullulan, markedly improves physical properties of the coated paper such as tearing strength, tensile strength, and wrinkle recovery; it improves also retention of loading materials such as clay and calcium carbonate.

The following examples illustrate this invention, but the examples are presented merely for purposes of illustration and not intended to limit the invention in any way.

In the examples, measurements were carried out in the following way.

(1) Gloss was evaluated by measuring the 75° specular gloss by means of a glossmeter (type GM-3 of Murakami Shikisai Giken Co.) (JIS P8142).

The printed surface gloss (ink gloss) was evaluated by solid-printing a printing ink (Speed King Ace TV-15 of Toyo Ink Co.) using the offset process and measuring the 75° specular gloss after drying.

(2) The brightness was measured by means of a Hunter reflectometer (JIS P812).

(3) Ink absorptivity was evaluated by applying a K and N ink to the coated surface of a specimen with a spatula and, after two minutes, wiping the excess ink off thoroughly with a piece of cloth, and measuring the brightness by means of a Hunter reflectometer.

(4) The RI dry and wet pick were tested by means of a RI tester. The RI dry pick was evaluated by using a printing ink (Speed King Ace TV-15) and recording the number of revolutions of the tester until picking of the coated surface of the specimen has occurred. The RI wet pick was evaluated by using a printing in (Speed King Ace TV-12) and measuring the percentage transfer of the ink to the wet coated surface of the specimen.

In the following examples, all parts are by weight unless otherwise indicated.

EXAMPLE 1

In 70 parts of water, was dissolved 16 parts of sodium hydroxide followed by 16.2 parts of pullulan having an average molecular weight of about 50,000 (number of recurring maltotriose units n=100). To the solution, was added an aqueous solution containing 7.8 parts of hydrochloride of 2-diethylaminoethyl chloride dissolved in 30 parts of water. The resulting mixture was allowed to react with stirring for 24 hours at 25° C. After completion of the reaction, hydrochloric acid was added to the reaction mixture until pH had reached 3. The resulting solution was enclosed in a piece of cellophane and dialyzed against water for 48 hours. Then, 1,000 parts of methanol was added to precipitate diethylaminoethylated pullulan. The precipitates were collected and dried. On elementary analysis of the dried product, the nitrogen content was found to be 1.91% by weight. The substitution degree was 0.26 mole per mole of glucose unit, as calculated from the nitrogen content. On the other hand, conductimetric titration showed a substitution degree of 0.24 mole per mole of glucose unit.

EXAMPLE 2

In 40 parts of water, was dissolved 9 parts of sodium hydroxide followed by 16.2 parts of pullulan having an average molecular weight of about 490,000 (number of recurring maltotriose units n=1,000). To the solution, was added an aqueous solution containing 7.8 parts of hydrochloride of 2-diethylaminoethyl chloride dissolved in 30 parts of water. The mixture was allowed to react with stirring for 10 hours at 50° C. After completion of the reaction, hydrochloric acid was added to the reaction mixture until pH had reached 3. The resulting solution was enclosed in a piece of cellophane and dialyzed against water for 48 hours. Then, 1,000 parts of methanol was added to precipitate diethylaminoethylated pullulan. The precipitates were collected and dried. On elementary analysis of the dried product, the nitrogen content was found to be 2.44% by weight. The substitution degree was 0.34 mole per mole of glucose unit, as calculated from the nitrogen content. On the other hand, conductimetric titration showed a substitution degree of 0.32 mole per mole of glucose unit.

EXAMPLE 3

The procedure of Example 1 was followed, except that 8.4 parts of 3-di-n-butylamino-1,2-epoxypropane was used in place of the hydrochloride of 2-diethylaminoethyl chloride.

On elementary analysis of the resultant 2-hydroxy-3-di-n-butylaminopropylated pullulan, the nitrogen content was found to be 1.05% by weight. The substitution degree was 0.23 per mole of glucose unit, as calculated from the nitrogen content. On the other hand, conductimetric titration showed a substitution degree of 0.21 per mole of glucose unit.

EXAMPLE 4

The procedure of Example 1 was followed, except that 7.2 parts of hydrochloride of 2-dimethylaminoisopropyl chloride was used in place of the hydrochloride of 2-diethylaminoethyl chloride.

On elementary analysis of the resultant 2-dimethylamino-1-methylethylated pullulan, the nitrogen content was found to be 1.82% by weight. The substitution degree was 0.25 per mole of glucose unit, as calculated from the nitrogen content. On the other hand, conductimetric titration showed a substitution degree of 0.23 per mole of glucose unit.

EXAMPLE 5

The procedure of Example 1 was followed, except that 13.8 parts of 2-bromo-5-diethylaminopentane hydrobromide was used in place of the hydrochloride of 2-diethylaminoethyl chloride.

On elementary analysis of the resultant 4-diethylamino-1-methyl-n-butylated pullulan, the nitrogen content was found to be 1.35% by weight. The substitution degree was 0.20 per mole of glucose unit, as calculated from the nitrogen content. On the other hand, conductimetric determination of the amine content showed a substitution degree of 0.18 per mole of glucose unit.

EXAMPLE 6

A coating composition was prepared by mixing 100 parts of kaolin clay (Ultrawhite 90), 0.3 part of sodium hexametaphosphate, 10 parts of pullulan diethylaminoethyl ether obtained in Example 2, 8 parts of styrene-butadiene latex (Dow Latex ® 620 manufactured by Dow Chemical Co.) and 118 parts of water.

The above coating composition was manually applied with a wire rod #14 to the wire side of a base paper (KYP of Sanyo Kokusaku Pulp Co.), then dried by heating at 100° C. for one minute, and finally twice supercalendered (60° C., 137 kg/cm). The resulting coated paper was tested for coating rate, gloss, gloss of the printed surface (ink gloss), brightness, ink absorptivity, RI dry pick, and RI wet pick. The test results were as shown in Table 1. It was found from the results that the coated paper prepared by the use of a pullulan diethylaminoethyl ether was excellent in gloss, ink gloss, ink absorptivity, RI dry pick and RI wet pick.

Comparative Example 1

A coated paper was prepared in the same manner as in Example 6, except that an oxidized starch (Esusansaiza ® 500 manufactured by Ajinomoto Co., Inc.) was used in place of the pullulan diethylaminoethyl ether.

Test results for coating rate, gloss, ink gloss, whiteness, ink absorptivity, RI dry pick and RI wet pick were as shown in Table 1.

Table 1.

| | Coating rate ($g/m^2$) | Gloss (%) | Printability Ink gloss (%) | Whiteness (%) | Ink absorptivity (whiteness %) | RI dry pick | RI wet pick |
|---|---|---|---|---|---|---|---|
| Example 6 | 20.0 | 74.0 | 89.0 | 81.6 | 50.2 | 5th revolution | Excellent |
| Comparative Example 1 | 19.0 | 58.3 | 77.0 | 81.5 | 56.7 | 2nd revolution | Good |

What is claimed is:

1. A pullulan aminoalkyl ether of the formula

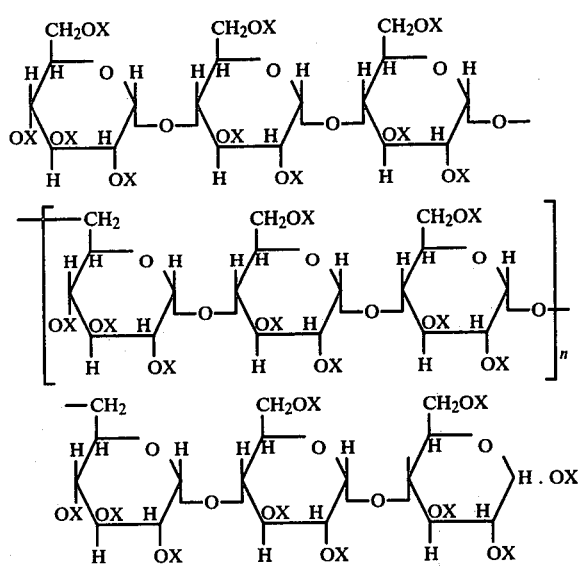

wherein n is an integer of 20 to 4,000 and X is H or a group represented by the general formula

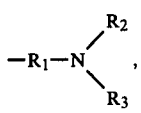

where $R_1$ is an alkylene group having 1 to 5 carbon atoms or a hydroxyalkylene group having 1 to 4 carbon atoms and $R_2$ and $R_3$ are each H, or an alkyl group having 1 to 4 carbon atoms; the number ratio of hydrogen atom to the group

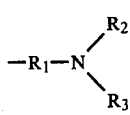

in X in one molecule being 0.001 to 2.0, and its salts including quaternary alkylamine salts thereof which are formed with an alkyl halide having 1 to 4 carbon atoms.

2. The pullulan aminoalkyl ether according to claim 1, wherein the pullulan aminoalkyl ether is in its free amine form or its organic or inorganic acid salt form.

3. The pullulan aminoalkyl ether according to claim 1, wherein the pullulan aminoalkyl ether is in a form of a quaternary alkylamine salts.

4. A pullulan aminoalkyl ether and a salt thereof according to claim 1, wherein $R_1$ in the general formula $-R_1-N{<}^{R_2}_{R_3}$ is $-(CH_2)_2-$, $-(CH_2)_3-$, $-CH_2-\overset{CH_3}{\underset{|}{CH}}-$, $-(CH_2)_4-$, $-CH_2-\overset{CH_3}{\underset{|}{CH}}-CH_2-$, $-\overset{CH_3}{\underset{|}{CH}}-CH_2-CH_2-$, $-(CH_2)_5-$, $-CH_2-\overset{}{\underset{|}{CH}}-CH_2-$, $-CH_2CH_2\overset{}{\underset{|}{CH}}-CH_2-$,
                         OH                                      OH $-CH_2CH_2\overset{}{\underset{|}{CH}}-CH_2CH_2-$ or $-CH_2-\overset{}{\underset{|}{CH}}-CH_2CH_2CH_2-$.
                OH                                                  OH 5. A pullulan aminoalkyl ether and a salt thereof according to claim 1, wherein the general formula $-R_1-N{<}^{R_2}_{R_3}$ is $-C_2H_4NH_2$, $-C_3H_6NH_2$, $-C_4H_8NH_2$, $-C_5H_{10}NH_2$, $-CH_2\overset{OH}{\underset{|}{CH}}CH_2NH_2$, $-CH_2CH_2N{<}^{H}_{CH_3}$, $-CH_2CH_2N{<}^{H}_{C_2H_5}$, $-CH_2CH_2CH_2N{<}^{H}_{C_2H_5}$, $-CH_2CH_2CH_2CH_2N{<}^{H}_{C_3H_7}$, $-CH_2\overset{OH}{\underset{|}{CH}}CH_2N{<}^{H}_{C_2H_5}$, $-CH_2CH_2N{<}^{CH_3}_{CH_3}$, $-CH_2CH_2N{<}^{C_2H_5}_{C_2H_5}$, $-CH_2\overset{CH_3}{\underset{|}{CH}}N{<}^{CH_3}_{CH_3}$, $-CH_2\overset{OH}{\underset{|}{CH}}CH_2N{<}^{CH_3}_{CH_3}$, or $-CH_2\overset{OH}{\underset{|}{CH}}CH_2N{<}^{C_2H_5}_{C_2H_5}$.

6. A salt of a pullulan aminoalkyl ether according to claim 1, wherein the salt-forming acid is hydrochloric acid, hydrobromic acid, sulfuric acid, nitric acid, acetic acid, or oxalic acid.

7. A quaternary salt of a pullulan aminoalkyl ether according to claim 1, wherein the salt-forming alkyl halide is methyl chloride, methyl bromide, methyl iodide, ethyl chloride, ethyl bromide, ethyl iodide, propyl chloride, propyl bromide, propyl iodide, butyl chloride, butyl bromide or butyl iodide.

* * * * *